United States Patent Office 3,523,083
Patented Aug. 4, 1970

3,523,083
STABILIZATION OF WHITE OILS
William G. De Pierri, Jr., Baytown, Tex., assignor to Esso Research and Engineering Company
No Drawing. Filed May 27, 1968, Ser. No. 732,050
Int. Cl. C10l 1/24; C10m 1/20, 1/38
U.S. Cl. 252—48.6                                    10 Claims

ABSTRACT OF THE DISCLOSURE

A synergistic mixture of a butylated, styrenated cresol and certain esters of thiodipropionic acid provides an effective stabilizer for preventing oxidative color degradation in white mineral oils. The white oil may contain from 0.03 to 0.5 weight percent of the mixture, which in turn contains 1 part by weight of the butylated styrenated cresol and from 0.1 to 2 parts by weight of an ester of thiodipropionic acid.

The preferred mixture is made up of 1 part by weight of styrenated, butylated cresol and 0.3 part by weight of the distearyl ester of thiodipropionic acid. It is preferably used in the white oil at a concentration of about 0.13 weight percent.

DESCRIPTION OF THE INVENTION

The present invention relates to the color stabilization of a white mineral oil. More particularly, it is directed to the stabilization of a white oil against color degradation due to oxidation, by incorporating in the white oil an effective amount of a synergstic mixture consisting essentially of 1 part by weight of a butylated, styrenated cresol and from 0.1 to 2 parts by weight of an ester of thiodipropionic acid.

Color stabilization of hydrocarbon products is a highly complex art. It is thought to be based upon the provision of a "trap" for free radicals generated from the hydrocarbons by the action of heat or light. Unless "trapped," such free radicals can react with oxygen and thereafter, by formation of conjugated unsaturated linkages, develop into color-forming compounds. The stabilizers are thought to react with free radicals such as —CH$_3$ or —C$_2$H$_5$ which are split off of larger molecules, as well as the residual sites from whence they were generated (which are also free radicals).

In the stabilization of polymers (such as polypropylene) which are essentially pure compounds, only a small number of types of free radicals are created. In polypropylene the initial oxidative attack is usually on the tertiary hydrogen atom (i.e. the hydrogen attached to the same carbon as the methyl group). The tertiary-free radical thus formed may react further to form a hydroperoxide which may then decompose to form stable compounds such as alcohols or ketones, and additional free radicals which propagate the radical chain. The stabilizer system for such a polymer would thus need to be active over a relatively narrow spectrum of free radical types. In white oils, however, the base mixture of hydrocarbons includes so many different compounds that a broader spectrum of free radical types is encountered and stabilizers which are effective in polypropylene are quite often not effective at all in stabilizing white oils. Further, the diversity of compounds in white oils makes it impossible to predict which stabilizers (or combinations of stabilizers) will be effective.

Films which are used in contact with food must be approved by the United States Food and Drug Administration. If white oils are used to plasticize such films, the stabilizer system in the white oils must also meet FDA standards. Thus, the stabilizer system must not only be effective, but must also be approved by the FDA.

The present invention provides an effective and acceptable stabilizer system. It is based on the use of an ester of thiodipropionic acid in admixture with a butylated, styrenated cresol. The white oils and stabilizer components are separately discussed below.

Base oils

White mineral oils (sometimes referred to as medicinal oils) are used for many purposes. One of the current uses of white mineral oils is in the plasticizing of polystyrene and other plastics which will be used as containers in food packaging applications. Since the plastics are to be used in contact with foodstuffs, the plastics and any plasticizers used therein must meet the requirements set by the Food and Drug Administration (FDA). White mineral oils meet the requirements of the FDA, and have been approved by the FDA for use in contact with food, and are therefore suitable for use with such plastics as have met such approval. However, white oils have proved to be troublesome in view of the color degradation which is experienced in the oil when the plasticized plastics are formed into films and shaped articles. The elevated temperatures to which the plastics are exposed during such manufacturing steps, during which exposure to atmospheric oxygen is possible, lead to a rapid degradation of the color of the oil which in turn causes a deterioration of the color of the plastic product. As will be understood, the desideratum is an absolutely clear ("water white") product, and such color deterioration is undesirable.

White mineral oils (referred to generally as "white oils") have been well known in the petroleum industry for many years. The white oils are generally recovered from crude oil by distillation, acid or "oleum" treating, and product finishing (e.g., by adsorption over suitable solid adsorbents), and may boil within the range from 500° F. to 1100° F. As an example, a white oil boiling within the range of 540° F. to 1050° F. may be obtained from a Coastal crude by the following steps: A fractionation cut is taken from the distillation tower, and this cut is then treated with aqueous sulfuric acid having a concentration of about 95% to 100% by weight, and the acid-treated oil is then neutralized and post-treated by adsorption over attapulgus clay.

The sulfuric acid treatment performs multiple functions, extracting some materials, sulfonating or sulfating other materials, oxidizing and polymerizing still others. The net result is that most of the deleterious materials are absorbed into the acid phase or converted into a sludge and removed from the hydrocarbon product, which is then recovered as a raffinate from the sulfuric acid treatment. The raffinate product is substantially free of sulfur-containing impurities and unsaturated materials, is water-clear, but remains susceptible to oxidative color degradation. Typical commercial oils are shown below in Table I.

TABLE I.—WHITE OILS—TYPICAL COMMERCIAL OILS

| | Oil I | Oil II |
|---|---|---|
| Distillation: | | |
| IBP (°F.) | 546 | 611 |
| 5 (°F.) | 714 | 720 |
| 50 (°F.) | 825 | 830 |
| 95 (°F.) | 940 | 940 |
| FBP (°F.) | 1,045 | 1,006 |
| Viscosity: | | |
| SSU at 100° F | 360 | 359.9 |
| SSU at 210° F | 53.8 | 53.5 |
| Specific gravity at: | | |
| 60° F | 0.885 | 0.884 |
| 77° F | 0.879 | |
| Color (Saybolt) | +30 | +30 |
| Flash Point: | | |
| P.M. closed cup (°F.) | 400 | |
| Cleveland open cup (°F.) | 430 | 430 |
| Pour Point (°F.) | −25 | −30 |

FDA standards for food-grade white oils are set forth in FR 121.1146 and FR 121.2589. Oils such as Oil I and Oil II have been approved. The constituents of the present stabilizer system either have received approval by FDA or could be expected to receive FDA approval.

The stabilizer system

The stabilizer system of the present invention is made up of two components:

(1) A butylated, styrenated cresol, and
(2) A suitable ester of thiodipropionic acid (hereinafter referred to as "Thiodipropionic Acid Ester").

The stabilizer system is added to the white oil in an effective amount, usually in sufficient amounts to obtain a concentration in the white oil of from 0.01 to 0.5 weight percent (preferably about 0.13 weight percent). The stabilizer system itself will be made up of the two components in variable ratios, ranging from 0.1 to 2.0 parts by weight of thiodipropionic acid ester for each part by weight of styrenated, butylated cresol; preferably 0.2 to 0.4 part of thiodipropionic acid ester per part of styrenated, butylated cresol.

The thiodipropionic acid ester component is derived from the acid having the formula:

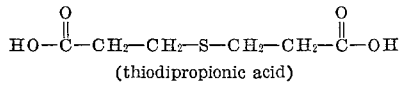

(thiodipropionic acid)

The particular ester is chosen to provide a high enough molecular weight to avoid volatilization. Thus, both diesters (such as dilauryl and distearyl) and polyesters (such as are derived from bifunctional alcohols) are acceptable. Exemplary diesters are obtained from monofunctional alcohols such as the $C_{12}$ to $C_{18}$ monohydroxy alcohols (e.g., the dilauryl, distearyl and mixed lauryl/stearyl esters). Exemplary of the polyesters is the polymeric product of thiodipropionic acid with 1,4-dimethylol cyclohexane:

Other bifunctional (or polyfunctional) alcohols, such as 1,6-hexane diol, glycerol, sorbitol, and pentaerythritol, can be used in forming suitable polyesters. The distearyl ester is preferred.

The butylated, styrenated cresol component is obtained when equal moles of isobutylene, styrene and a m-cresol/p-cresol mixture are reacted so that the final product contains:

| | Percent |
|---|---|
| Butylated cresols | 20–24 |
| Styrenated cresols | 23.5–28.5 |
| Butylated, styrenated cresols | 42–48 | and has an acidity not more than 0.0003% and a refractive index at 25° C. of 1.5500 to 1.5600 as determined by ASTM D 1218–61. The m-cresol/p-cresol mixture has a 3° C. distillation range including 202° C. The reaction can be carried out at 30 to 130° C. and at atmospheric pressure for a time period (e.g., 4 hours) sufficient to completely react the constituents.

EXAMPLES

In order to illustrate the synergistic action of the present mixture, a number of samples of white oil were prepared and aged in an air circulating oven for 96 hours at 150° C. The results of these studies are shown below in Table II.

TABLE II.—COLOR STABILITY OF WHITE OIL SAMPLES [1]

| Sample | Cresol conc., percent | DSTDP Conc.,[2] percent | Ester/cresol ratio | Final color (Saybolt) |
|---|---|---|---|---|
| 1 | Blank | | | [3] −15 |
| 2 | 0.1 | | | [3] −18 |
| 3 | 0.1 | 0.02 | 0.2 | +26 |
| 4 | 0.1 | 0.01 | 0.1 | +19 |
| 5 | 0.03 | 0.06 | 2.0 | +18 |
| 6 | | 0.1 | | [3] −17 |

[1] Oil I of Table I was used as the white mineral oil. The samples were aged in an air circulating oven for 96 hours at 150° C.
[2] DSTDP is an abbreviation for distearyl thiodipropionate.
[3] Converted from Tag Robinson Color to Saybolt Color scale.

Note that in the blank sample the color after aging is −15 Saybolt, roughly equivalent to an off-white color. Sample 2, which contained 0.1% of the butylated, styrenated cresol but contained no distearyl thiodipropionate, had a color almost as bad as the blank. Sample 6, containing only distearyl thiodipropionate, had virtually the same color as Sample 2. The admixture of 0.1% of the butylated, styrenated cresol with 0.02% of distearyl thiodipropionate, however, improved the color to +26 Saybolt, which is essentially water white (Sample 3). Samples 4 and 5, showing different proportions of the two constituents of the synergistic mixture, also resulted in a virtually water white product. Thus, the present invention is seen to provide effective stabilization of white oils against oxidative color degradation.

Having disclosed my invention, what I claim is:

1. A color-stabilized white oil containing an effective amount of a stabilizer system consisting essentially of 1 part by weight of a butylated, styrenated cresol and from 0.1 to 2.0 parts by weight of an ester of thiodipropionic acid.

2. A composition in accordance with claim 1 wherein the white oil has a boiling range within the limits from 500° F. to 1100° F.

3. A composition in accordance with claim 2 wherein the ester of thiodipropionic acid is distearyl thiodipropionate.

4. A composition in accordance with claim 3 wherein the concentration of the stabilizer system in the stabilized white oil is from 0.01 weight percent to 0.5 weight percent.

5. A composition in accordance with claim 3 wherein the ratio of distearyl thiodipropionate to butylated, styrenated cresol is 0.2.

6. A composition in accordance with claim 5 wherein the concentration of the stabilizer system is 0.12 weight percent.

7. A composition in accordance with claim 5 wherein the stabilizer system contains 2 parts by weight of distearyl thiodipropionate per part by weight of butylated, styrenated cresol.

8. A composition in accordance with claim 7 wherein the concentration of the stabilizer system in the white oil is about 0.09 weight percent.

9. A composition in accordance with claim 5 wherein the stabilizer system contains 0.1 part by weight of distearyl thiodipropionate per part by weight of butylated, styrenated cresol.

10. A composition in accordance with claim 9 wherein the concentration of the stabilizer system in the white oil is about 0.11 weight percent.

References Cited

UNITED STATES PATENTS 2,397,976  4/1946   O'Leary ---------- 252—406 X
3,278,434  10/1966  Hoffman ---------- 252—48.6
Re. 22,909 8/1947  Smith et al. ---------- 44—78 X DANIEL E. WYMAN, Primary Examiner W. J. SHINE, Assistant Examiner U.S. Cl. X.R.

44—76, 78; 252—52, 404, 406